F. LEDERER.
REAR TIRE HOLDER FOR AUTOMOBILES.
APPLICATION FILED JULY 18, 1912.
1,086,377.
Patented Feb. 10, 1914.
2 SHEETS—SHEET 1.
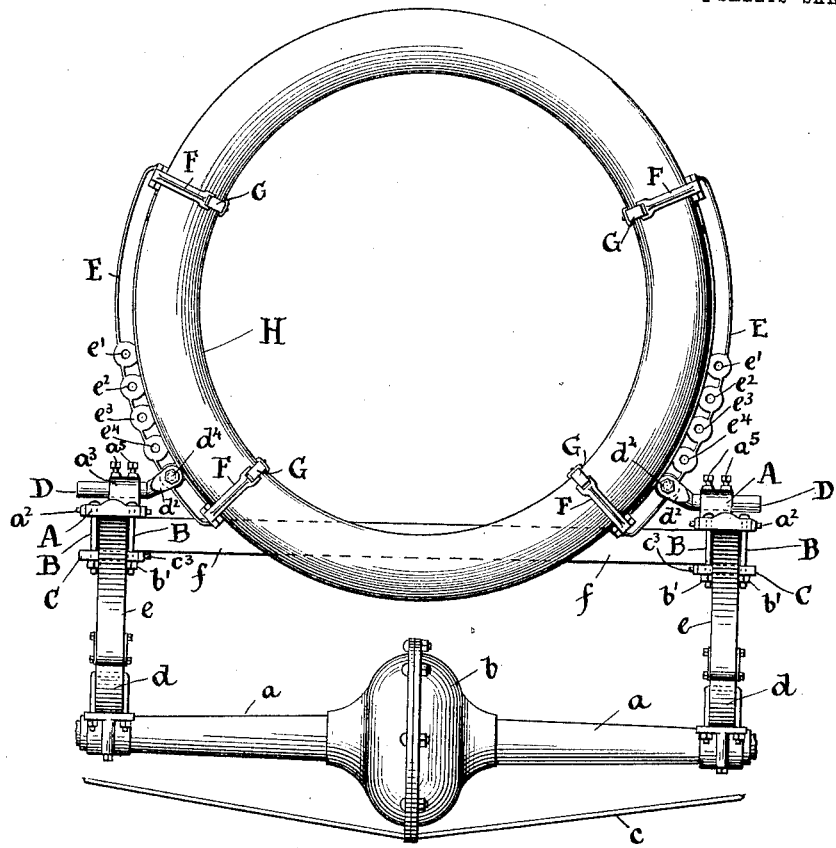
Fig. 1
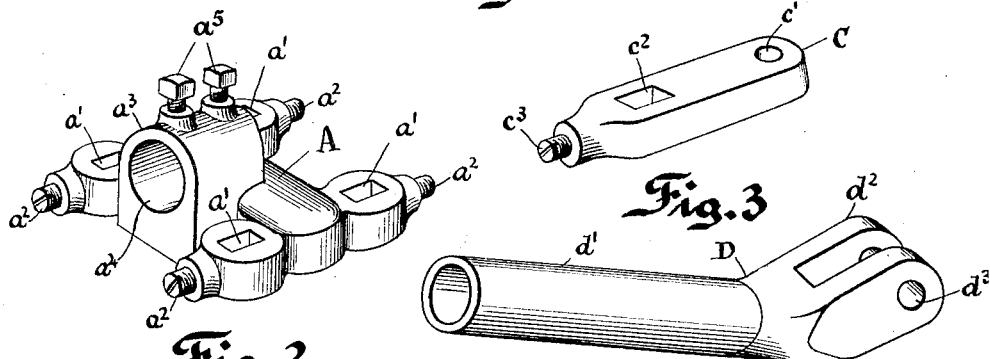
Fig. 2
Fig. 3
Fig. 4
Witnesses
Martin H. Olsen
C. R. Cramer
Inventor
Friedrich Lederer, Inventor,
By George Delmar Colley
Attorney

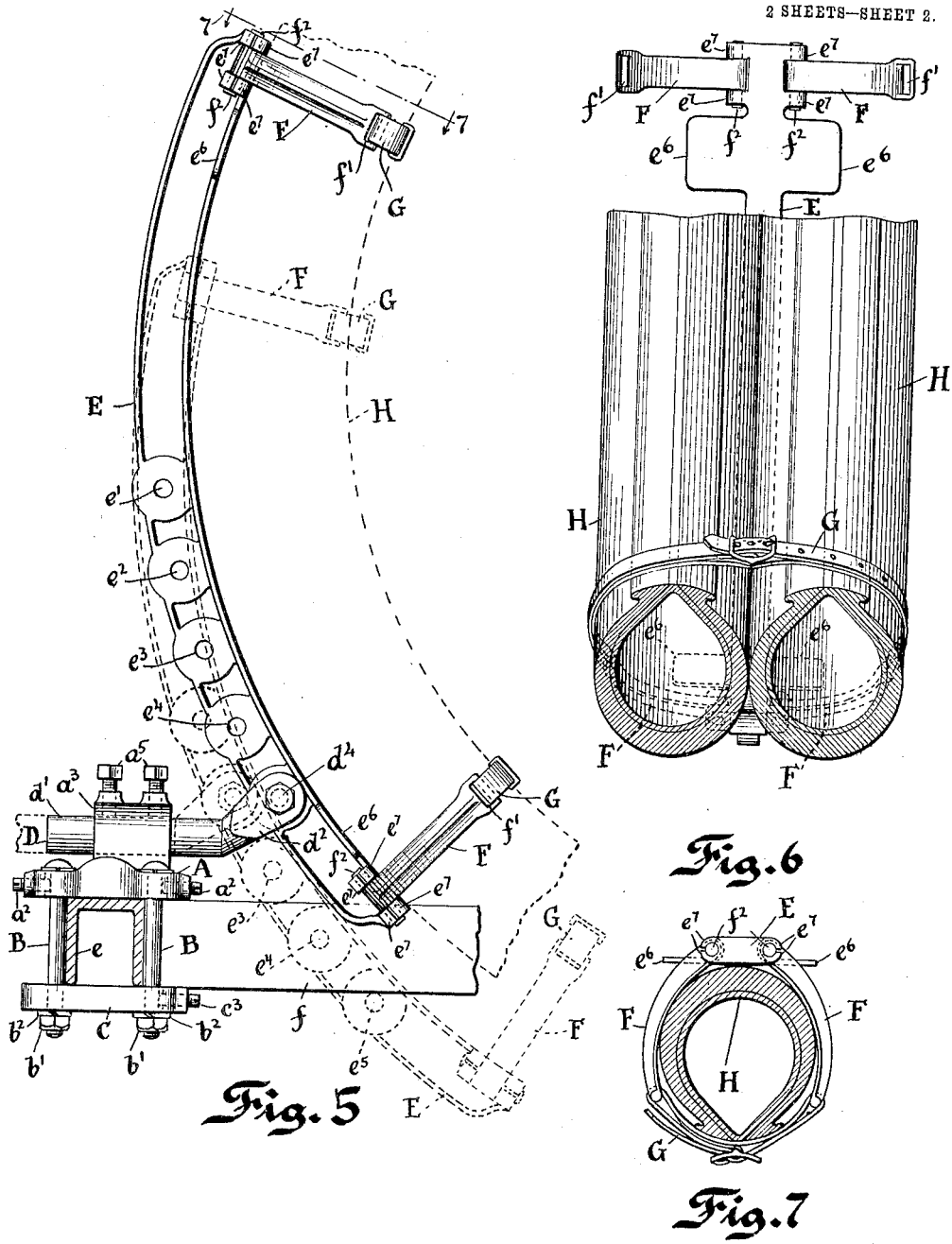

UNITED STATES PATENT OFFICE.

FRIEDRICH LEDERER, OF MILWAUKEE, WISCONSIN.

REAR TIRE-HOLDER FOR AUTOMOBILES.

1,086,377. Specification of Letters Patent. Patented Feb. 10, 1914.

Application filed July 18, 1912. Serial No. 710,103.

*To all whom it may concern:*

Be it known that I, FRIEDRICH LEDERER, of Milwaukee, Wisconsin, have invented a certain Rear Tire-Holder for Automobiles, of which the following is a specification.

This invention relates to improvements in tire-supporters or carriers for use on automobiles for carrying extra tires, and particularly in that type of tire-holder which is known as a rear tire-holder, being designed for carrying a tire at the rear of the tonneau, the plane of the tire being transverse to the direction of movement of the vehicle.

The invention aims primarily to provide a device of this class so constructed as to permit of a universal adjustment to all kinds of automobiles, which, as is well understood, vary as regards the forms and positions of the point of support to which the members of the tire-holder can be secured.

My tire-holder is also capable of adjustment to permit the tire to be supported in an elevated or depressed position and to be swung so that the plane thereof is oblique in the case where it is desirable for it to lie flat against the sloping back of the tonneau.

I further aim to provide a holder which is capable of ready adjustment to support either one or two tires firmly and solidly, and to permit of practically instantaneous removal of the tire or putting in place thereon.

My invention is best illustrated by the following description of the most improved form thereof, reference being had to the accompanying drawings; and the parts, elements and combinations constituting the invention are specifically set forth in my claims.

In the aforesaid drawings Figure 1 is an elevation looking from the rear of the automobile, showing portions of the framework thereof, and my tire-holder in position together with a tire supported thereby; Figs. 2, 3 and 4 are perspective views of individual elements of the holder; Fig. 5 shows, on a larger scale than Fig. 1, one side of the holder, illustrating the adjustment thereof by a dotted-line position; Fig. 6 is a view from the right of the upper part of Fig. 5, showing the method of carrying two tires; Fig. 7 is an end-view of the curved tire-supporting bar, showing a tire held in place thereby and in section upon the plane 7 of Fig. 5.

In these drawings, the same reference character refers to the same part wherever used.

For the sake of illustration, Fig. 1 shows members of the automobile, to wit, the rear axle casing $a$, driving gear-casing $b$, brace-bar $c$, elliptical supporting-springs $d$, and longitudinal frame-bars $e$ and transverse frame-bars $f$ of the chassis, upon which, in the present instance, as a convenient point of support, the tire-holder is shown as being mounted. It will be understood, of course, that the chassis-bars $e$, or other suitable elements which project from the rear of the automobile, vary in shape, form and position so as to be nearer or farther apart, horizontal, vertical or sloping, and it will be seen that the design of my tire-holder is such as to provide for these differences.

As the tire-holder proper consists of two symmetrical sets of elements, one on each side of the center, as shown in Fig. 1, only one need be described, the reference letters being the same for the two sides. A base-member A, shown in perspective in Fig. 2, is provided with four longitudinal slots $a'$ suitable to receive bolts B, which are passed through said slots and are adjustable laterally therein. The member A is seated upon the top of the chassis-frame-bar $e$ or like projecting element, and upon the bottom thereof are applied a pair of cleats C, one of which is shown in perspective bottom-side up in Fig. 3. The ends of the four bolts B pass through holes $c'$ and slots $c^2$ in the cleats C, and nuts $b'$, preferably provided with spring-washers $b^2$ (Fig. 5), are screwed upon the ends of the bolts so as to clamp the base A firmly upon the frame-bar. Furthermore, in order to give the base a firm hold against lateral as well as vertical and longitudinal movement upon the frame-bar, there are provided four set-screws $a^2$ threaded into apertures in the member A, which project into the slots $a'$, whereby the turning up of said set-screws forces the bolts B against the sides of the member $e$, so as to grip the same; and correspondingly, the cleats C have a set-screw $c^3$ in one end projecting into the slot $c^2$ for similarly drawing the lower ends of the bolts B together; in this case, it is not necessary that set-screws $c^3$ should be applied to both ends of the cleat.

The base-member A has formed on it a socket-lug $a^3$, which is perforated by a cylindrical socket $a^4$ to receive the shank $d'$ of a bolt D, which is slidable longitudinally in said socket and can be clamped therein by a pair of set-screws $a^5$ projecting thereinto. The head $d^2$ of the bolt D is turned obliquely to the shank as shown, giving a greater range of adjustability by permitting it to be turned up or down for various conditions of use. This head $d^2$ is forked and perforated with a bolt-hole $d^3$ to receive a bolt $d^4$, which passes through any one of a number of perforations $e'$, $e^2$, $e^3$, $e^4$, and $e^5$, placed along the length of the tire-supporting-bar E, which is curved to conform to the periphery of the tire and carries upon each end a pair of pivoted jaws or clasp-bars F, which have formed in their free ends slots $f'$ through which is passed a strap G, in such manner as to inclose the tire between the strap and the clasp-bars and thereby hold it in place on the center-line of the bar E. In the case where it is desired to support two tires, as shown in Fig. 6, it is simply necessary to spread the clasp-bars F wider apart and they then form supports for the outer sides of said tires, the strap passing around them both instead of only one, and it will, of course, be understood that the strap G may be passed one or more times completely around the tire or tires and bar $e$ if desired for greater security. In order moreover to assist in preventing the tires from becoming dislodged sidewise and getting to one side of the bar E, said bar is provided at its upper and lower ends with wings $e^6$ upon which the treads of the tires can rest.

The particular device by which the clasp-bars F are pivotally mounted upon the bar E form an element of my invention. Each of said clasp-bars has formed on its pivoted end a pair of gudgeons $f^2$, and the bar E is formed at each end with four pairs of projecting fingers $e^7$, which when the bar E is cast are straight. After casting (and malleableizing if the material is cast iron) and properly dressing the surface between each two fingers $e^7$, the clasp-bar $f$ is placed with its gudgeons $f^2$ between said fingers and the latter are then bent over with a hammer or other tool so as to embrace the gudgeons and form bearings for the same. The advantage of this arrangement is not merely that it avoids several extra cores in casting, but also that it provides a resilient grip for the clasp-bars, because the fingers $e^7$ exert a spring-pressure on the gudgeons and hold them with sufficient force to prevent them from swinging back and forth, which would be very inconvenient in use, and furthermore, if by constant use the gudgeons should become loose in their bearings, they can be easily tightened again by hammering said fingers $e^7$ or otherwise forcing them to close upon the gudgeons. The bearings being then kept tight, moreover, there is no opportunity for rain and mud to get into them and rust them and thus cause them to stick or become still looser.

As indicated by the dotted-line position in Fig. 5, it will be clear that the tire can be elevated or depressed by shifting the bolt $d^4$ from one of the holes $e'$, $e^2$, $e^3$, $e^4$, $e^5$ to another, and likewise the bar E can be turned about the bolt $d^4$ as a pivot so as to follow the contour of the tire in the new position. Moreover, the bolts $d^4$ can be spread or moved together by shifting the bolts D in their sockets $a^4$, and the tire can be turned into the oblique plane about the axes of the two bolts D, the set-screws $a^5$ serving to clamp and hold the position to which the device is so adjusted. It will, therefore, be obvious that my tire-holder provides for every contingency of shape, and dimensions which is ordinarily found upon an automobile.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the scope of my claims. Although particularly adapted for the position at the rear of the automobile, it may be also conceivable at the side thereof and in other locations without altering the principles of the construction.

The holes $e'$, $e^2$, etc., are formed only in one-half of the bars E; should it be desired to apply the bolts $d^4$ above the center of said bar, the latter is simply reversed in position.

Having thus described my invention, what I claim as new and desire to secure by Letters Patent is:

1. A tire-holder consisting of two symmetrical independent sets of devices adapted to be secured to opposite sides of the frame at the rear of an automobile; each set of devices comprising a base-member adapted to be secured to a projecting part of the automobile, and a tire-supporting member to which the tire is adapted to be secured; said tire supporting member having a horizontal adjustment toward and from the center-line of the vehicle and also a vertical adjustment with regard to said base-member.

2. In combination, a member adapted to be secured in a fixed position and having a transverse perforation in the head thereof, a tire-supporting bar having a plurality of perforations along its length, and a bolt adapted to pass through the perforation in said first-named member and any one of the perforations in said bar and to clamp said bar in fixed relation to said first-named member.

3. The combination of a base-member having a socket, a bolt having a horizontal shank slidable in said socket and a transversely perforated head, a tire-supporting bar having a plurality of transverse holes along its length, and a bolt passing through the perforation in said head and one of the holes in said bar and securing said bolt and bar in fixed relation; whereby a longitudinal and pivotal adjustment is secured for said bar with respect to said bolt.

4. The combination of a base-member having a socket, a bolt having a horizontal shank slidable in said socket and a transversely perforated head, a tire-supporting-bar having a plurality of transverse holes along its length, and a bolt passing through the perforation in said head and one of the holes in said bar and securing said bolt and bar in fixed relation; whereby a longitudinal and pivotal adjustment is secured for said bar with respect to said bolt, said bolt having its head lying obliquely to the shank whereby it gives two different positions of adjustment.

5. In a tire-holder, a base-member having bolt-holes, a transverse cleat coöperating with said base-member and having bolt-holes, one of the holes in said base-member and also one in said cleat being elongated, a pair of bolts, each passing through one hole in each member and adapted to clamp the two members firmly upon a member of the vehicle-frame, and a pair of bolt-clamping-screws turning in threaded sockets in said base-member and said cleat respectively and adapted to abut against the outer side of one of said bolts and when screwed up to clamp the two bolts laterally against the sides of said frame-member.

6. In a tire-holder, the combination with the tire-supporting-member of a pair of curved clasp-bars adapted to embrace the tire, means for securing the tire between them, each of said clasp-bars being pivotally mounted on opposite sides of said tire-supporting-member; said clasp-bars being formed with integral gudgeons at their pivotal ends and said tire-supporting-member being formed with integral fingers which curve around and jointly inclose said gudgeons and press against them resiliently, thereby holding said clasp-bars frictionally in the position in which they are placed.

7. In a tire-holder, the combination of a tire-supporting member, a clasp-bar adapted to partially embrace a tire and having a pair of integral gudgeons on one end, and two pairs of integral fingers on said tire-supporting member, each pair jointly extending around and inclosing one of said gudgeons forming a bearing therefor.

8. In a tire-holder, the combination of a tire-supporting member, a clasp-bar adapted to partially embrace a tire and having a pair of gudgeons on one end, and two pairs of fingers on said tire-supporting member, each pair jointly extending around and inclosing one of said gudgeons and forming a bearing therefor, said fingers pressing resiliently upon said gudgeons and having an open space between opposite fingers whereby said gudgeons are tightly and frictionally held and the pressure can be renewed when decreasing by wear, substantially as described.

9. A tire-holder consisting of two symmetrical independent sets of devices adapted to be secured to opposite sides of the frame at the rear of an automobile; each set of devices comprising a base-member adapted to be secured to a projecting part of the automobile, a tire-supporting member to which the tire is adapted to be secured, a third member shiftable with respect to said base-member, means for clamping said third member in various positions with respect to said member, said tire-supporting member being also shiftable with respect to said third member and adjustable vertically with respect to said base-member and pivotally adjustable upon an axis transverse to the plane of the tire, and means for clamping said tire-supporting member in each of its said adjustments.

10. In combination, a member adapted to be secured in a fixed position, a tire-supporting bar having a plurality of pivotal centers, and means for securing said tire-supporting bar to said member in pivotally adjustable relation about any of said centers.

11. In combination, a tire-supporting bar having means for securing a tire thereto in fixed nonturnable relation therewith, said tire-supporting bar having a pivotal axis parallel to the axis of the tire to be supported, a base-member, and an intermediate member having a substantially parallel shank-portion adapted to be secured to said base-member in various positions of angularity about its center, said intermediate member having also means for engaging and securing said tire-supporting bar at its axis whereby said bar can be adjusted to various positions about said axis.

12. In combination, a tire-supporting bar having means for securing a tire thereto in fixed nonturnable relation therewith, said tire-supporting bar having a pivotal axis parallel to the axis of the tire to be supported, a base-member, and an intermediate member having a substantially parallel shank-portion adapted to be secured to said base-member in various positions of angularity about its center, said intermediate member having also means for engaging and securing said tire-supporting bar at its axis whereby said bar can be adjusted to various positions about said axis; the axis of said pivot being offset vertically on said intermediate member with respect to the shank thereof whereby two different vertical positions of said pivot may be obtained by reversing said intermediate member.

13. The combination of a base-member having a socket, a bolt having a horizontal shank slidable in said socket, means for clamping the bolt in said socket, a tire-supporting bar secured to said bolt and adjustable upon said bolt about a pivotal axis substantially at right angles to the axis of said bolt, and means carried by said tire-supporting bar for securing a tire thereto in substantially rigid nonrotative relation therewith with said bar in outer circumferential relation to said tire.

14. The combination of a base-member having a socket, a bolt having a horizontal shank slidable in said socket, means for clamping the bolt in said socket, an arcuate tire-supporting bar secured to said bolt and adjustable about a pivotal axis with respect thereto, and means for securing said bar at two points spaced apart to a tire with the bar on the outer circumference of the tire whereby the center of arc of said bar is coincident with the center of said tire.

In witness whereof, I have hereunto set my hand in the presence of two witnesses.

FRIEDRICH LEDERER.

Witnesses:
  John B. McCabe,
  Bern. S. Amann, Jr.

---

Copies of this patent may be obtained for five cents each, by addressing the "Commissioner of Patents, Washington, D. C."

---